US012659163B2

(12) United States Patent
Latha et al.

(10) Patent No.: US 12,659,163 B2
(45) Date of Patent: *Jun. 16, 2026

(54) INTELLIGENT METHOD TO PREVENT DUPLICATE EVENT PROCESSING USING A DISTRIBUTED LEDGER

(71) Applicant: Bank of America Corporation, Charlotte, NC (US)

(72) Inventors: Andya Madhavi Latha, Hyderabad (IN); Saravanan Balasubramanian, Chennai (IN); Arjun Raj Besam, Hastinapuram (IN); Jayakumar Manokaran, Chennai (IN); Dhanshree Belkhade, Sukharali (IN); Vijay Kumar Bathula, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 119 days.

This patent is subject to a terminal disclaimer.

(21) Appl. No.: 18/608,293

(22) Filed: Mar. 18, 2024

(65) Prior Publication Data

US 2025/0293888 A1 Sep. 18, 2025

(51) Int. Cl.
  *H04L 9/32* (2006.01)
  *H04L 9/08* (2006.01)
(52) U.S. Cl.
  CPC .......... *H04L 9/3236* (2013.01); *H04L 9/0816* (2013.01)
(58) Field of Classification Search
  CPC ........ H04L 9/3236; H04L 9/0816; H04L 9/50
  See application file for complete search history.

(56) References Cited

U.S. PATENT DOCUMENTS

| | | |
|---|---|---|
| 9,811,413 B2 | 11/2017 | Ojalvo et al. |
| 10,387,426 B2 | 8/2019 | Singh et al. |
| 10,402,792 B2 | 9/2019 | Lin et al. |
| 10,552,805 B2 | 2/2020 | Chan et al. |
| 10,630,463 B2 | 4/2020 | Mankovskii et al. |
| 10,740,196 B2 | 8/2020 | Park et al. |
| 11,032,292 B2 | 6/2021 | Gluck et al. |
| 11,057,353 B2 | 7/2021 | Smith et al. |
| 11,146,574 B2 | 10/2021 | Muddu et al. |
| 11,228,439 B2 | 1/2022 | Wang |
| 11,308,035 B2 | 4/2022 | Prahlad et al. |
| 11,385,826 B2 | 7/2022 | Yao et al. |

(Continued)

*Primary Examiner* — Pramila Parthasarathy
(74) *Attorney, Agent, or Firm* — Banner & Witcoff, Ltd.

(57) ABSTRACT

Arrangements for preventing duplicate event processing are provided. A computing platform may train a machine learning engine to determine whether to post an event to a corresponding user account. The computing platform may receive a first event hash corresponding to a first event. The computing platform may query a database to determine whether information in the first event hash matches an invalid key stored in the database. The computing platform may generate a first event block based on the first event hash. The computing platform may validate the first event block by establishing a consensus with one or more event assessment systems. The computing platform may use the machine learning engine to output an even exception score and compare the event exception score to a threshold. The computing platform may post the first event based on the event exception score meeting or exceeding the threshold.

20 Claims, 9 Drawing Sheets

(56) References Cited

U.S. PATENT DOCUMENTS

| 11,599,528 | B1 | | 3/2023 | Holenstein et al. |
| 11,647,081 | B2 | | 5/2023 | Kasten et al. |
| 11,736,300 | B2 | * | 8/2023 | Herrin ........................ H04L 9/50 |
| 2019/0386969 | A1 | | 12/2019 | Verzun et al. |
| 2020/0084027 | A1 | | 3/2020 | Duchon et al. |
| 2020/0151686 | A1 | | 5/2020 | Komandur et al. |
| 2021/0217001 | A1 | | 7/2021 | Harrison |
| 2023/0119636 | A1 | | 4/2023 | Conley et al. |
| 2023/0306513 | A1 | | 9/2023 | Wilkins et al. |

* cited by examiner

100

102

Ledger Based Duplication Prevention Platform

111

Processor(s)

112

Memory(s)

Duplication Prevention Module
112a

Duplication Prevention Database
112b

Machine Learning Engine
112c

Distributed Ledger Module 112d

Invalid Key Database 112e

113

Communication Interface(s)

INTELLIGENT METHOD TO PREVENT DUPLICATE EVENT PROCESSING USING A DISTRIBUTED LEDGER

BACKGROUND

Aspects of the disclosure relate to one or more systems that may assess, process, and/or post an event, for example, to a user account associated with the event. Currently, the one or more systems (that together may represent, e.g., an enterprise organization) may each individually post events without interacting and/or communicating with each other, which may lead to processing and/or posting duplicate events. Accordingly, it may be advantageous to identify more effective and efficient methods to prevent posting duplicate events.

SUMMARY

Aspects of the disclosure provide effective, efficient, scalable, and convenient solutions that address and overcome the technical problems associated with preventing duplicate events from being posted. In accordance with one or more aspects of the disclosure, a computing platform with at least one processor, a communication interface communicatively coupled to the at least one processor, and memory storing computer-readable instructions may train, based on historical data, a machine learning engine, in which training the machine learning engine may configure the machine learning engine to determine whether to post an event associated with an event block to a user account. The computing platform may receive a first event hash, in which the first event hash may correspond to a first event that is associated with a first user account. The computing platform may query an invalid key database to determine whether one of one or more invalid keys stored at the invalid key database may match information in the first event hash. The computing platform may generate, based on determining that the information in the first event hash does not match any of the one or more invalid keys, a first event block based on the first event hash. The computing platform may validate the first event block by communicating with one or more event assessment systems, in which the validating may establish a consensus between the computing platform and the one or more event assessment systems. The computing platform may add, based on the validating, the first event block to a distributed ledger. The computing platform may input the first event block into the machine learning engine. The computing platform may use the machine learning engine to output an event exception score, which may be based on triggering one or more event exceptions and may compare the event exception score to a threshold. The computing platform may post the first event to the first user account based on the event exception score not meeting or exceeding the threshold. The computing platform may send a notification that the first event was posted and one or more commands directing the first user account to display the notification that the first event was posted, which may cause the first user account to display the notification that the first event was posted.

In one or more examples, the computing platform may receive a second event hash, in which the second event hash may correspond to a second event that may be associated with a second user account. The computing platform may query the invalid key database to determine whether one of the one or more invalid keys stored at the invalid key database may match information in the second event hash.

The computing platform may generate, based on determining that information in the second event hash does match any of the one or more invalid keys, a second event block based on the second event hash. The computing platform may invalidate the second event block by failing to establish the consensus between the computing platform and the one or more event assessment systems. The computing platform may create a new invalid key that may be based on the second event block. The computing platform may store the new invalid key at the invalid key database.

In some instances, the computing platform may receive a third event hash, in which the third event hash may correspond to a third event that may be associated with a third user account. The computing platform may query the invalid key database to determine whether one of the one or more invalid keys stored at the invalid key database may match information in the third event hash. The computing platform may determine not to generate a third event block based on finding a match between the information in the third event hash and the new invalid key during the querying.

In one or more examples, the computing platform may further train the machine learning engine using historical user account data, which may include account numbers, product codes, geographic information, or balances; and historical data patterns, which may include event activity, event types, transaction maximums, transaction minimums, or transaction history. In some instances, the distributed ledger may further include a record of events associated with a plurality of user accounts and corresponding validated event blocks.

In one or more examples, the first event hash may include a first account number and a first event code. In some instances, the first event block may include the first event hash, a first product code and a first event amount. In one or more examples, the first event block may be generated using a cryptographic process.

In some instances, the validating may further include sending the first event block to the one or more event assessment systems and receiving an indication from the one or more event assessment systems that the first event block has been validated. In one or more examples, the computing platform may update, using a dynamic feedback loop and based on validating the first event block and determining to post the first event, the machine learning engine.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1A:
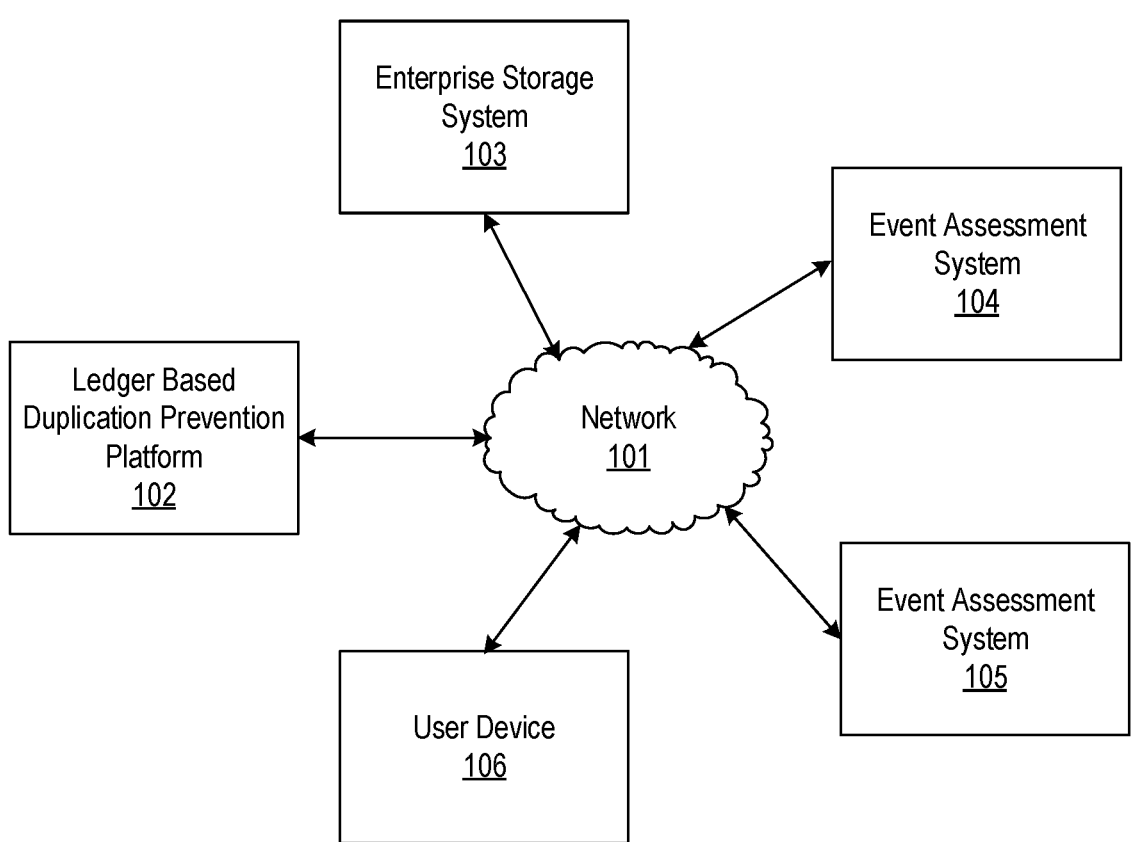
FIGS. 1A-1B depict an illustrative computing environment for implementing an intelligent method to prevent duplicate event processing using a distributed ledger in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect. As a brief introduction to the concepts described further herein, one or more aspects of the disclosure relate to preventing duplicate event processing using a distributed ledger.

An enterprise organization (e.g., e.g., a corporation, financial institution, educational institution, governmental institution, or the like) may include multiple systems that may process events and/or impose costs associated with those events. In some instances, events may be counted twice (e.g., duplicated) if the systems do not communicate with each other with respect to the same events and/or associated costs. Avoiding duplications by tracking events across the systems may be important to prevent loss of reputation and maintain accuracy across the systems.

Accordingly, described herein is a combination of a distributed ledger and a machine learning engine that may be used to avoid assessing and/or posting duplicate events. One or more systems may be provided information that may contain user accounts that may be monitored, and further may assess corresponding events and may create event blocks using an event hash. In some instances, other systems (e.g., event assessment systems) in the network may validate and may either approve or reject the event block. In doing so, the block may be added to the distributed ledger after consensus is reached.

Accordingly, if an event block is rejected, then the information corresponding to the event block may be turned into an invalid key and may be moved to a memory pool instead of being added to the distributed ledger. Before moving to the memory pool, the invalid key may be read and stored to a local cache (e.g., an invalid key database). This cache may be used by assessments systems for processing subsequent events. This may improve the performance of the one or more systems accordingly.

Accordingly, new event blocks that have been added to the approved distributed ledger may also be sent to a machine learning engine to build an intelligent classification model by feeding data points and patterns, which may be used to train the machine learning engine, so that the machine learning engine may predict and classify events accordingly in order to determine whether to post an event to a user account.

These and other features are described in greater detail below.

Figure 1B:
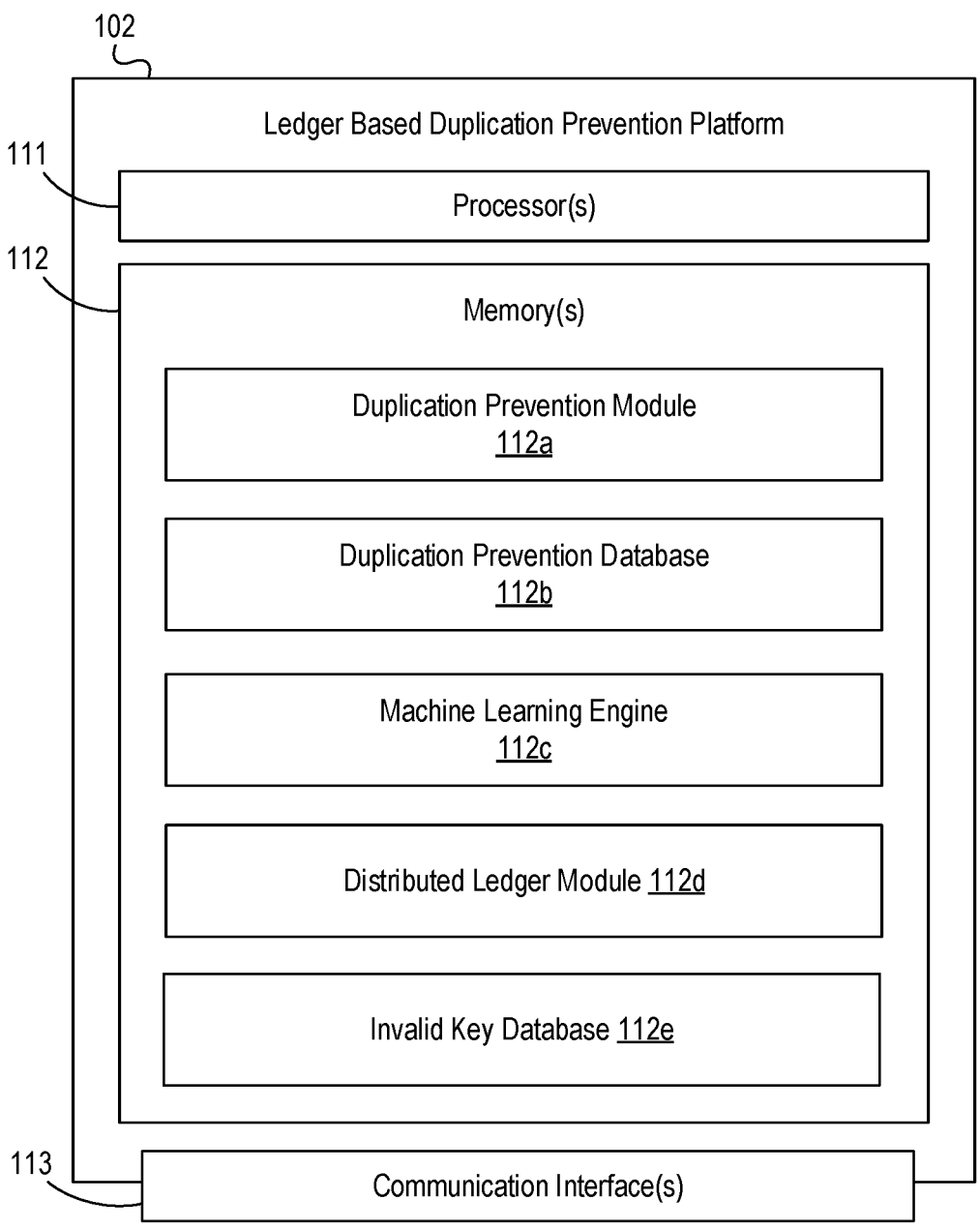

FIGS. 1A-1B depict an illustrative computing environment for implementing an intelligent method to prevent duplicate event processing using a distributed ledger in accordance with one or more example embodiments. Referring to FIG. 1A, computing environment 100 may include one or more computer systems. For example, computing environment 100 may include a ledger based duplication prevention platform 102, an enterprise storage system 103, an event assessment system 104, an event assessment system 105, and a user device 106.

As described further below, ledger based duplication prevention platform 102 may be a computer system that includes one or more computing devices (e.g., servers, server blades, or the like) and/or other computer components (e.g., processors, memories, communication interfaces) that may be used to train, host, configure, and/or otherwise refine a machine learning engine, which may be used to determine whether to post an event to a user account, and/or perform other functions. In some instances, ledger based duplication prevention platform 102 may further be used to host, configure, and/or otherwise update a distributed ledger, which may be used to record and/or store event blocks corresponding to a plurality of events, and/or perform other functions.

Enterprise storage system 103 may be or include one or more computing devices (e.g., servers, server blades, or the like) and/or computer components (e.g., processors, memories, communication interfaces, and/or other components). In some instances, enterprise storage system 103 may include one or more data sources that may store historical data, which may be used to train a machine learning engine to determine whether to post an event to a user account, as discussed in more detail below. In some instances, enterprise storage system 103 may be configured as a cloud storage system, in which enterprise storage system 103 may be a cloud computing model that stores data on the Internet through a cloud computing provider who manages and operates enterprise storage system 103 as a service. In some instances, enterprise storage system 103 may be local or non-cloud based storage, or may support cloud based storage.

Event assessment system 104 and event assessment system 105 may be or include one or more computing devices (e.g., servers, server blades, or the like) and/or computer components (e.g., processors, memories, communication interfaces, and/or other components). In some instances, event assessment system 104 and/or event assessment system 105 may generate event hashes, support ledger based duplication prevention platform 102 in establishing consensus for an event block, and/or perform other functions, as discussed in more detail below. In some instances, event assessment system 104 and event assessment system 105 may use and/or otherwise be integrated into a same physical computing device. In some instances, event assessment system 104 and event assessment system 105 may use and/or otherwise be integrated into different computing devices. In some instances, event assessment system 104 and event assessment system 105 may support cloud infrastructure.

User device 106 may be a laptop computer, desktop computer, mobile device, tablet, smartphone, and/or other device, which may correspond to a user account in which in an event may be posted. In some instances, user device 106 may be a user computing device that is used by an individual. In some instances, user device 106 may be an enterprise computing device that is used by an administrator. In some instances, user device 106 may be configured to display one or more user interfaces (e.g., interfaces depicting that an event was posted, or the like). Although only a single user device 106 is depicted, this is for illustrative purposes only, and any number of user devices may be implemented in the environment 100 without departing from the scope of the disclosure.

Computing environment 100 also may include one or more networks, which may include ledger based duplication prevention platform 102, enterprise storage system 103, event assessment system 104, event assessment system 105, and user device 106. For example, computing environment 100 may include a network 101 (which may interconnect, e.g., ledger based duplication prevention platform 102, enterprise storage system 103, event assessment system 104, event assessment system 105, and user device 106, and/or other computing devices).

In one or more arrangements, ledger based duplication prevention platform 102, enterprise storage system 103, event assessment system 104, event assessment system 105, and user device 106 may be any type of computing device capable of sending and/or receiving requests and processing the requests accordingly. For example, ledger based duplication prevention platform 102, enterprise storage system 103, event assessment system 104, event assessment system 105, and user device 106, and/or the other systems included in computing environment 100 may, in some instances, be and/or include, server computers, desktop computers, laptop computers, tablet computers, smart phones, or the like that may include one or more processors, memories, communication interfaces, storage devices, and/or other components. As noted above, and as illustrated in greater detail below, any and/or all of ledger based duplication prevention platform 102, enterprise storage system 103, event assessment system 104, event assessment system 105, and user device 106 may, in some instances, be special-purpose computing devices configured to perform specific functions.

Referring to FIG. 1B, ledger based duplication prevention platform 102 may include one or more processors 111, memory 112, and communication interface 113. A data bus may interconnect processor 111, memory 112, and communication interface 113. Communication interface 113 may be a network interface configured to support communication between ledger based duplication prevention platform 102 and one or more networks (e.g., network 101, or the like). Memory 112 may include one or more program modules having instructions that when executed by processor 111 cause ledger based duplication prevention platform 102 to perform one or more functions described herein and/or one or more databases that may store and/or otherwise maintain information which may be used by such program modules and/or processor 111. In some instances, the one or more program modules and/or databases may be stored by and/or maintained in different memory units of ledger based duplication prevention platform 102 and/or by different computing devices that may form and/or otherwise make up ledger based duplication prevention platform 102. For example, memory 112 may have, host, store, and/or include duplication prevention module 112a, duplication prevention database 112b, machine learning engine 112c, distributed ledger module 112d, and/or invalid key database 112e.

Duplication prevention module 112a may have instructions that direct and/or cause ledger based duplication prevention platform 102 to generate and/or validate an event block, add an event block to a distributed ledger (e.g., distributed ledger module 112d), input an event block into a machine learning engine (e.g., machine learning engine 112c), and/or perform other functions. Duplication prevention database 112b may store information used by the duplication prevention module 112a and/or ledger based duplication prevention platform 102 in application of techniques to prevent duplicate event processing, and/or perform other functions. Machine learning engine 112c may be configured and/or used by ledger based duplication prevention platform 102 and/or intelligent module 112a to host, train, refine and/or otherwise update a machine learning engine to determine whether to post an event associated with an event block to a user account, and/or perform other functions. Distributed ledger module 112d may be configured and/or used by ledger based duplication prevention platform 102 to host, maintain, and/or otherwise modify a distributed ledger that may record and/or store a plurality of event blocks associated with a plurality of corresponding user accounts, and/or perform other functions. Invalid key database 112e may be configured and/or used by ledger based duplication prevention platform 102 to store a plurality of invalid keys that correspond to event blocks that were invalidated by ledger based duplication prevention platform 102 and/or one or more event assessment systems (e.g., event assessment system 104, event assessment system 105), and/or perform other functions.

Figure 2A:
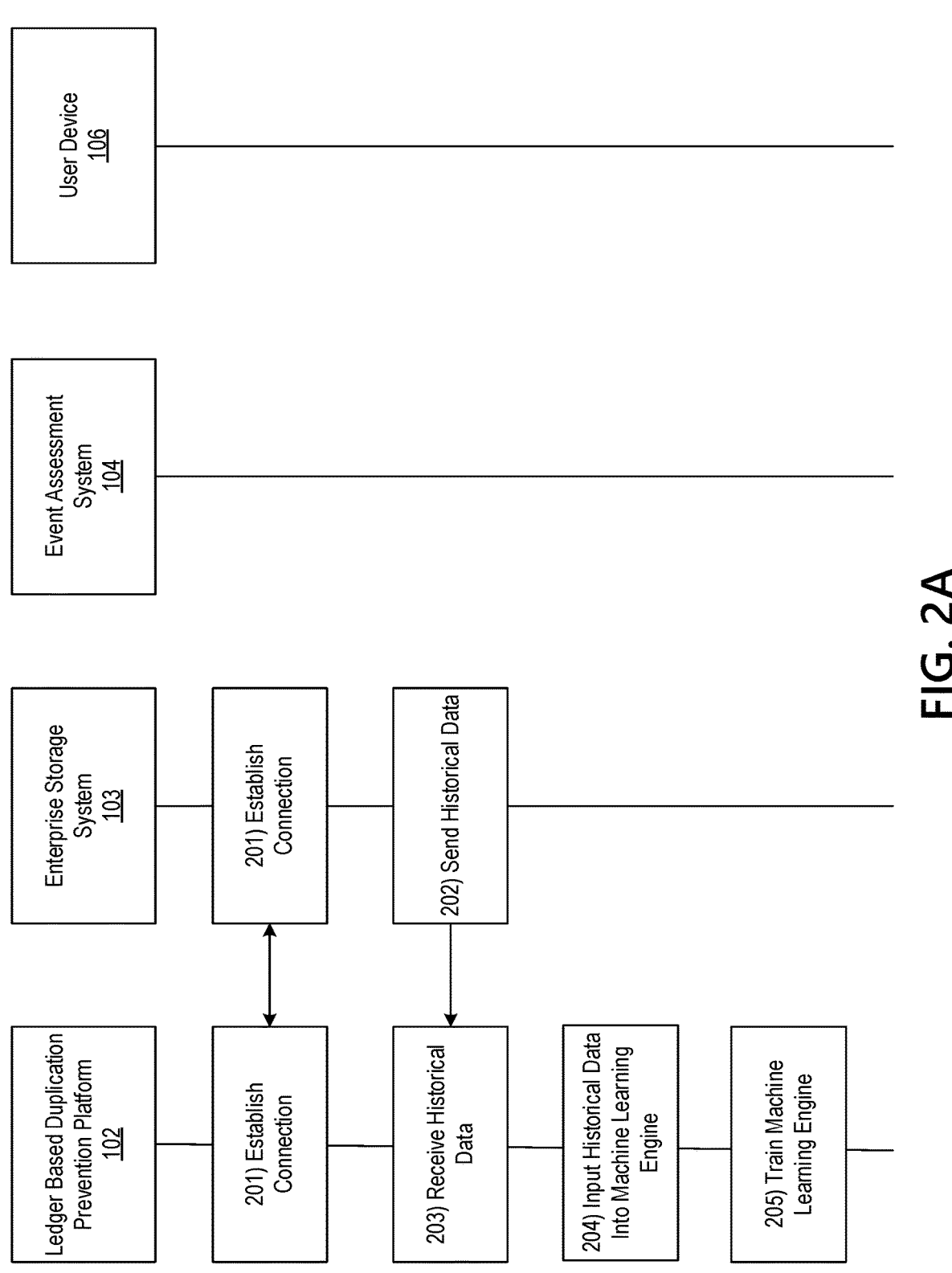
FIGS. 2A-2E depict an illustrative event sequence for implementing an intelligent method to prevent duplicate event processing using a distributed ledger in accordance with one or more example embodiments.

FIGS. 2A-2E depict an illustrative event sequence for implementing an intelligent method to prevent duplicate event processing using a distributed ledger in accordance with one or more example embodiments. Referring to FIG. 2A, at step 201, enterprise storage system 103 may establish a connection with ledger based duplication prevention platform 102. For example, enterprise storage system 103 may establish a first wireless data connection ledger based duplication prevention platform 102 to link enterprise storage system 103 to ledger based duplication prevention platform 102 (e.g., in preparation for sending historical data). In some instances, enterprise storage system 103 may identify whether or not a connection is already established with ledger based duplication prevention platform 102. If a connection is already established with ledger based duplication prevention platform 102, enterprise storage system 103 might not re-establish the connection. If a connection is not already established with ledger based duplication prevention platform 102, enterprise storage system 103 may establish the first wireless data connection as described herein.

At step 202, version enterprise storage system 103 may send the historical data to ledger based duplication prevention platform 102. For example, enterprise storage system 103 may send the historical data to ledger based duplication prevention platform 102 while the first wireless data connection is established.

At step 203, ledger based duplication prevention platform 102 may receive the historical data. In receiving the historical data, ledger based duplication prevention platform 102 may receive information such as historical user account data (e.g., account numbers, product codes, geographic information, balances, and/or other data), historical data patterns (e.g., event activity, event types, transaction types, transaction history, transaction maximums/minimums, and/or other data), or the like, which may be used to train a machine learning engine to determine whether to post an event to a user account.

At step 204, ledger based duplication prevention platform 102 may input the historical data into a machine learning engine (e.g., machine learning engine 112c). In some instances, the machine learning engine may utilize supervised learning, in which labeled data sets may be input into the machine learning engine (e.g., historical user account data, historical data patterns, or the like), which ledger based duplication platform 102 may use to train the machine learning engine to classify information and accurately predict outcomes with respect to determining whether to post an event to a user account. Using labeled inputs and outputs, the machine engine may measure its accuracy and learn over time. For example, supervised learning techniques such as linear regression, classification, neural networking, and/or other supervised learning techniques may be used.

Additionally or alternatively, the machine learning engine may utilize unsupervised learning, in which unlabeled data may be input into the machine learning engine. For example, unsupervised learning techniques such as k-means, gaussian mixture models, frequent pattern growth, and/or other unsupervised learning techniques may be used. In some instances, the machine learning engine may be a combination of supervised and unsupervised learning. In doing so, ledger based duplication prevention platform 102 may dynamically and continuously update and/or otherwise refine the machine learning engine so as to increase accuracy of the machine learning engine over time.

At step 205, ledger based duplication prevention platform 102 may train the machine learning engine based on the historical data that was inputted into the machine learning engine in step 204. For example, in training the machine learning engine, ledger based duplication prevention platform 102 may utilize a classification model, in which certain types of data may be classified as corresponding to a particular category of information (e.g., historical user account data, historical data patterns, and the like). In doing so, ledger based duplication prevention platform 102 may configure the machine learning engine to recognize that a particular type of data belongs to a corresponding category of information when future information is subsequently inputted into the machine learning engine.

Additionally or alternatively, in training the machine learning engine, ledger based duplication prevention platform 102 may configure the machine learning engine to receive an event block, determine whether to post the event associated with the event block to a user account, and/or perform other functions. For example, ledger based duplication prevention platform 102 may train the machine learning engine to, upon receiving an event block, classify the underlying information that forms the event block (e.g., account number, event code, product code, or the like), compare and/or analyze that information against the historical data that was used to train the machine learning engine, and make a decision as to whether the event associated with the event block may be posted. For example, a user account that may have been recently created (e.g., active for less than 30 days) might not need to have a corresponding event posted to the user account given its newer status.

Figure 2B:
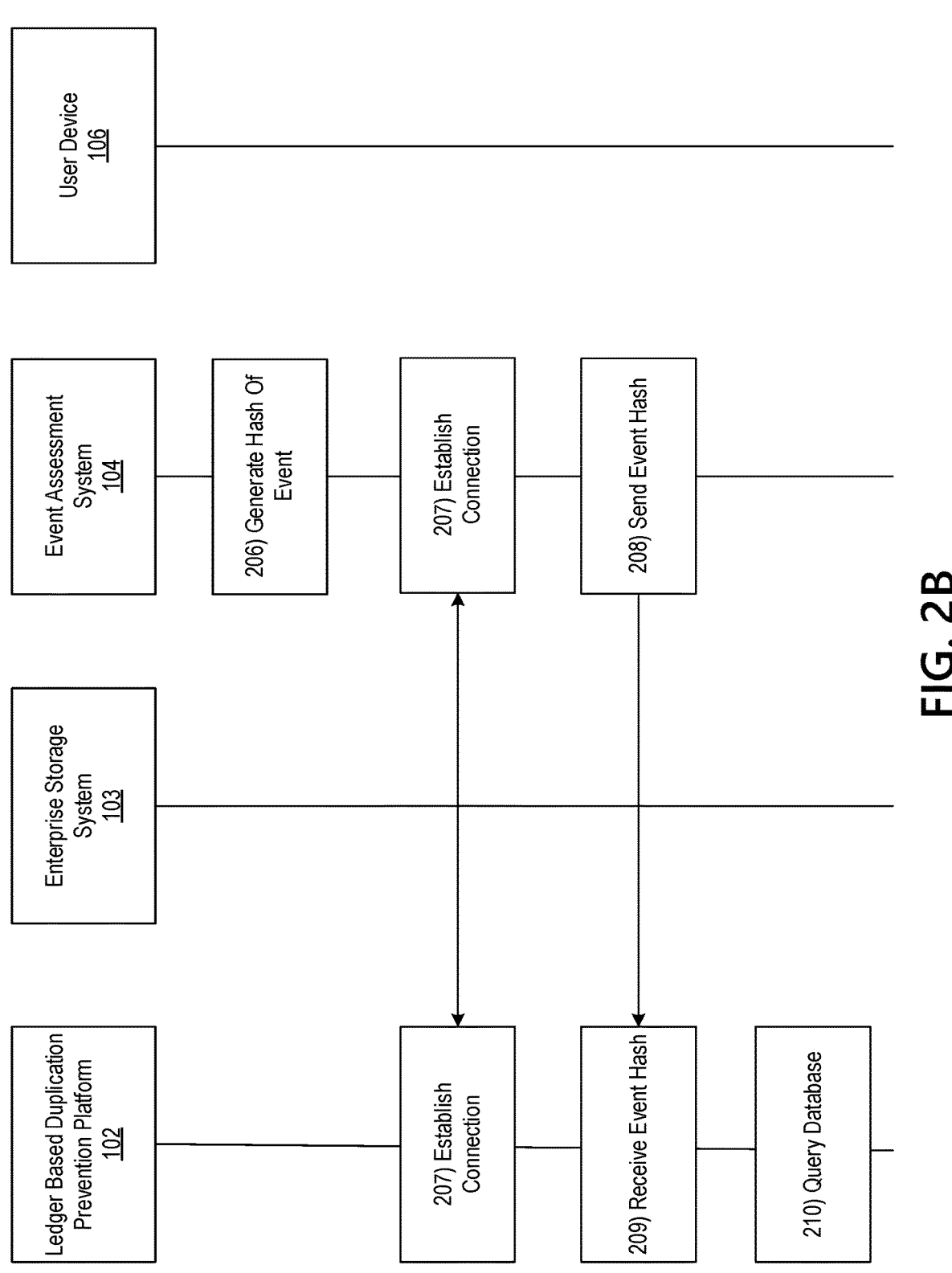

Referring to FIG. 2B, at step 206, event assessment system 104 may generate an event hash based on an event. An event may represent an activity or transaction associated with a corresponding user account, such as a monthly transaction cost, a deficit transaction cost, a scheduled transaction cost, or the like. In some instances, the event hash may be an alphanumeric code that corresponds to the event, and may include information such as an account number associated with a user account, an event code associated with the event, or the like. In some instances, event assessment system 104 may be a system of record (SOR) that may assess a plurality of events and generate a plurality of event hashes corresponding to the plurality of events. Additionally or alternatively, other event assessment systems (e.g., event assessment system 105) and/or ledger based duplication prevention platform 102 may also assess events and generate corresponding event hashes without departing from the scope of the disclosure.

At step 207, event assessment system 104 may establish a connection with ledger based duplication prevention platform 102. For example, event assessment system 104 may establish a first wireless data connection ledger based duplication prevention platform 102 to link event assessment system 104 to ledger based duplication prevention platform 102 (e.g., in preparation for sending an event hash). In some instances, event assessment system 104 may identify whether or not a connection is already established with ledger based duplication prevention platform 102. If a connection is already established with ledger based duplication prevention platform 102, event assessment system 104 might not re-establish the connection. If a connection is not already established with ledger based duplication prevention platform 102, event assessment system 104 may establish the first wireless data connection as described herein.

At step 208, event assessment platform 104 may send the event hash to ledger based duplication prevention platform 102. For example, event assessment system 104 may send the event hash to ledger based duplication prevention platform 102 while the second wireless data connection is established. Although step 208 may refer to event assessment platform 104 as sending the event hash to ledger based duplication prevention platform 102, other event assessment systems (e.g., event assessment systems 105) may, in parallel, send additional event hashes to ledger based duplication prevention platform 102 without departing from the scope of the disclosure.

At step 209, ledger based duplication prevention platform 102 may receive the event hash that was sent in step 208. At step 210, ledger based duplication prevention platform 102 may query a database (e.g., invalid key database 112e) to determine whether one or more invalid keys stored at the database matches information in the event hash. For example, the database may store one or more invalid keys that correspond to previous events that were invalidated based on ledger based duplication prevention platform 102 failing to establish consensus regarding the validity of the event with one or more event assessment systems (e.g., event assessment system 104 and/or event assessment system 105), as discussed in more detail with respect to step 212.

In some instances, if ledger based duplication prevention platform 102 does not find a match (representing, e.g., not finding a match between information in the event hash and an invalid key corresponding to a previously invalidated event), ledger based duplication prevention platform 102 may proceed to step 211 and generate an event block based on the event hash. If ledger based duplication prevention platform 102 finds a match (representing, e.g., finding an invalid key that matches information in the event hash), ledger based duplication prevention platform 102 may not generate an event block and instead may proceed to step 222 and update the machine learning engine. Additionally or alternatively, ledger based duplication prevention platform 102 may send a notification to event assessment system 104 that a match was found between information in the event hash and one of the invalid keys.

For example, an invalid key may contain information about an event that may have been previously posted to a user account, which may not be posted again to that user account in order to avoid a duplicate event. Ledger based duplication prevention platform 102 may identify a match by matching, for example, an event code (representing, e.g., a monthly transaction cost) in the invalid key to an identical event code in the event hash. In some instances, an invalid key may be used for more than one user account, for example, a group of user accounts with the same account type (e.g., a checking or savings account). In this manner, ledger based on duplication platform 102 may quickly identify whether an event hash is valid without performing the actions of steps 211-214 (e.g., generating an event block using the event hash, validating the event block, and inputting the event block into a machine learning engine for further processing), thus providing the technical benefit of saving computing resources (e.g., bandwidth, processing power, memory, etc).

Figure 2C:
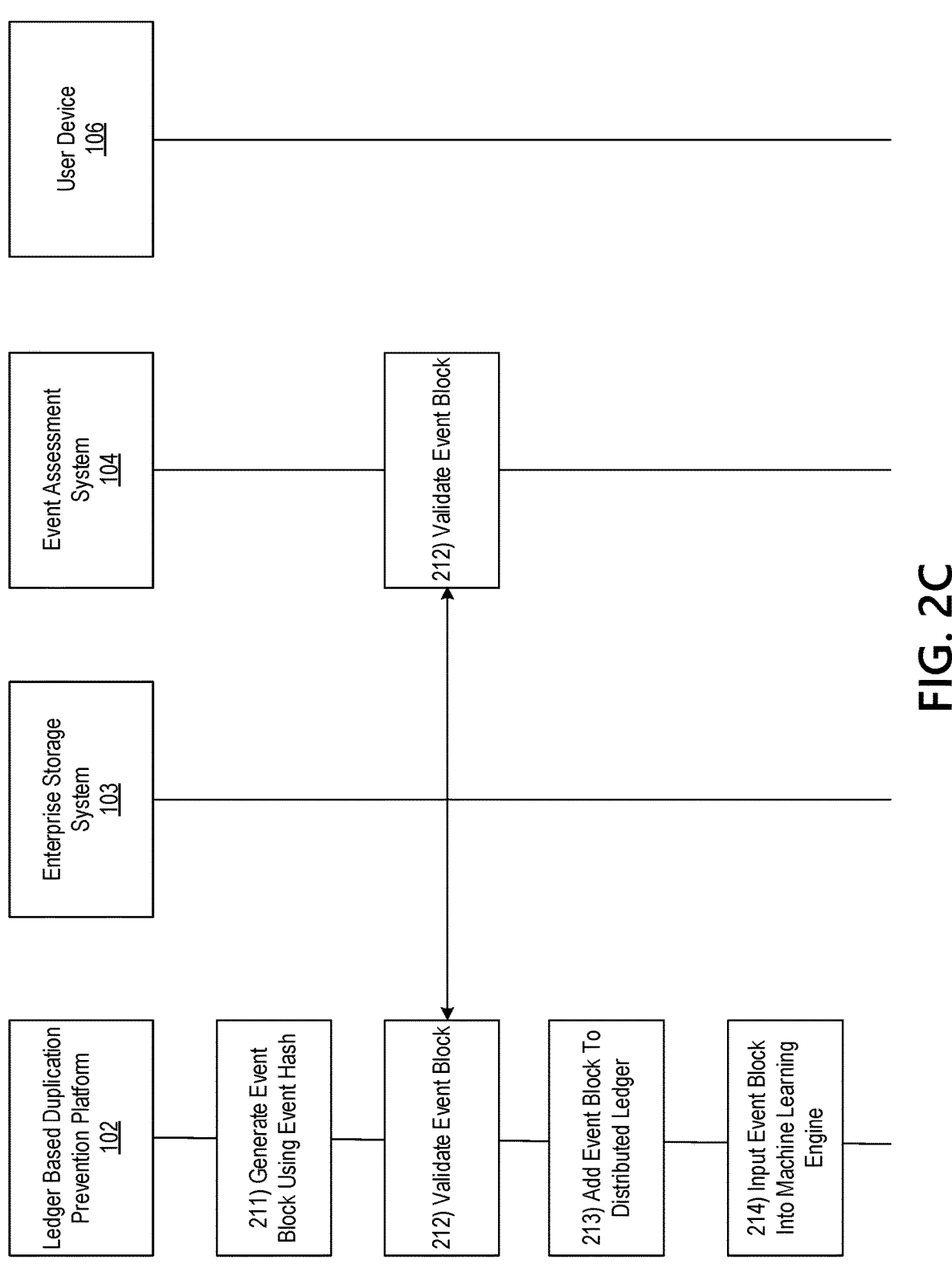

Referring to FIG. 2C, at step 211, ledger based duplication prevention platform 102 may generate an event block using the event hash. For example, in generating the event block, ledger based duplication prevention platform 102 may combine the event hash and underlying information in the event hash (e.g., an account number, an event code, or the like) with other data, such as an account type, a product code, a transaction amount, and/or other types of data. In some instances, in generating the event block, ledger based duplication prevention platform 102 may utilize a cryptographic process (e.g., a message-digest algorithm, a secure hash algorithm (SHA-256), advanced encryption system (AES), symmetric or asymmetric cryptography, or the like) to securely generate the event block, thereby providing the technical benefits of privacy, integrity, and/or authentication.

At step 212, ledger based duplication prevention platform 102 may validate the event block by communicating with one or more event assessment systems (e.g., event assessment system 104 and/or event assessment system 105) to establish consensus between ledger based duplication prevention platform 102 and the one or more event assessment systems. For example, ledger based duplication prevention platform 102 may identify, using the event block, a product code associated with the event block, representing, for example, a product associated with the event (e.g., checking, savings, personal, business, loan, investment products, etc). Then, ledger based duplication prevention platform 102 may further identify one or more event assessment systems (e.g., event assessment system 104, event assessment system 105, and/or other systems) that may be SORs for that particular product code. For example, if ledger based duplication prevention platform 102 identifies event assessment system 104 as being a SOR for the product code in the event hash (e.g., an investment product code), then ledger based duplication prevention platform 102 may request that event assessment system 104 validate the corresponding event block to establish consensus. In some instances, ledger based duplication prevention platform 102 may communicate with and send the event block to event assessment system 104 in furtherance of establishing consensus using, for example, the second wireless data connection.

In some instances, event assessment system 104 may validate the event block by analyzing the information in the event block (e.g., the account number, account type, event code, product code, transaction amount, or the like) and determine either to approve or reject the event block based on whether or not the underlying information in the event block is valid. For example, event assessment system 104 may, based on determining that a particular event code is no longer active, reject the event block with that event code. If event assessment system 104 does not identify information that may lead to rejecting the event block, event assessment system 104 may approve the event block. In some instances, event assessment system 104 may send an indication of the approval or rejection of the event block to ledger based duplication prevention platform 102. In some instances, either of ledger based duplication prevention platform 102 and/or event assessment system 104 may request that the event block be sent to additional event assessment systems (e.g., event assessment system 105) for additional validation.

Although described with respect to event assessment system 104, consensus may be established between ledger based duplication prevention platform 102 and additional event assessment systems (e.g., event assessment system 105) without departing from the scope of the disclosure. In doing so, ledger based duplication prevention platform 102 may establish consensus based on the event block being approved by the one or more event assessment systems. In this manner, a decentralized process may be used to establish consensus between multiple systems, thereby providing the technical benefits of resource sharing and increased confidence of event block validity and security. In some instances, the number of times the event block is approved and/or validated may be compared to a threshold in order to establish consensus. Additionally or alternatively, ledger based duplication prevention platform 102 may similarly approve or reject an event block without departing from the scope of the disclosure.

If ledger based duplication prevention platform 102 establishes consensus with respect to the event block, then ledger based duplication prevention platform 102 may proceed to step 213 and add the event block to a distributed ledger. If ledger based duplication prevention platform 102 does not establish consensus, ledger based duplication prevention platform 102 may generate an invalid key based on the event block, and store the invalid key in the invalid key database 112e, which may be used by ledger based duplication prevention platform 102 in step 210. Then, ledger based duplication prevention platform 102 may proceed to step 222 and update the machine learning engine.

At step 213, ledger based duplication prevention platform 102 may add the event block to a distributed ledger (which may be hosted by, e.g., distributed ledger module 112d). For example, the distributed ledger may be a record containing a plurality of events corresponding to a plurality of user accounts, which ledger based duplication prevention platform 102 may use as an accurate, secure, and immutable record of the events.

At step 214, ledger based duplication prevention platform 102 may input the event block into a machine learning engine (e.g., machine learning engine 112c) in order to determine whether to post the event associated with the event block to a user account. For example, the machine learning engine may classify the underlying information in the event block (e.g., the account number, event code, product code, etc), and compare and/or analyze that information to determine whether or not to post the event associated with the event block. For example, if the user account associated with the event has been active for less than 30 days, then an exception may be triggered, which be used as part of outputting an event exception score, as discussed in step 215.

Figure 2D:
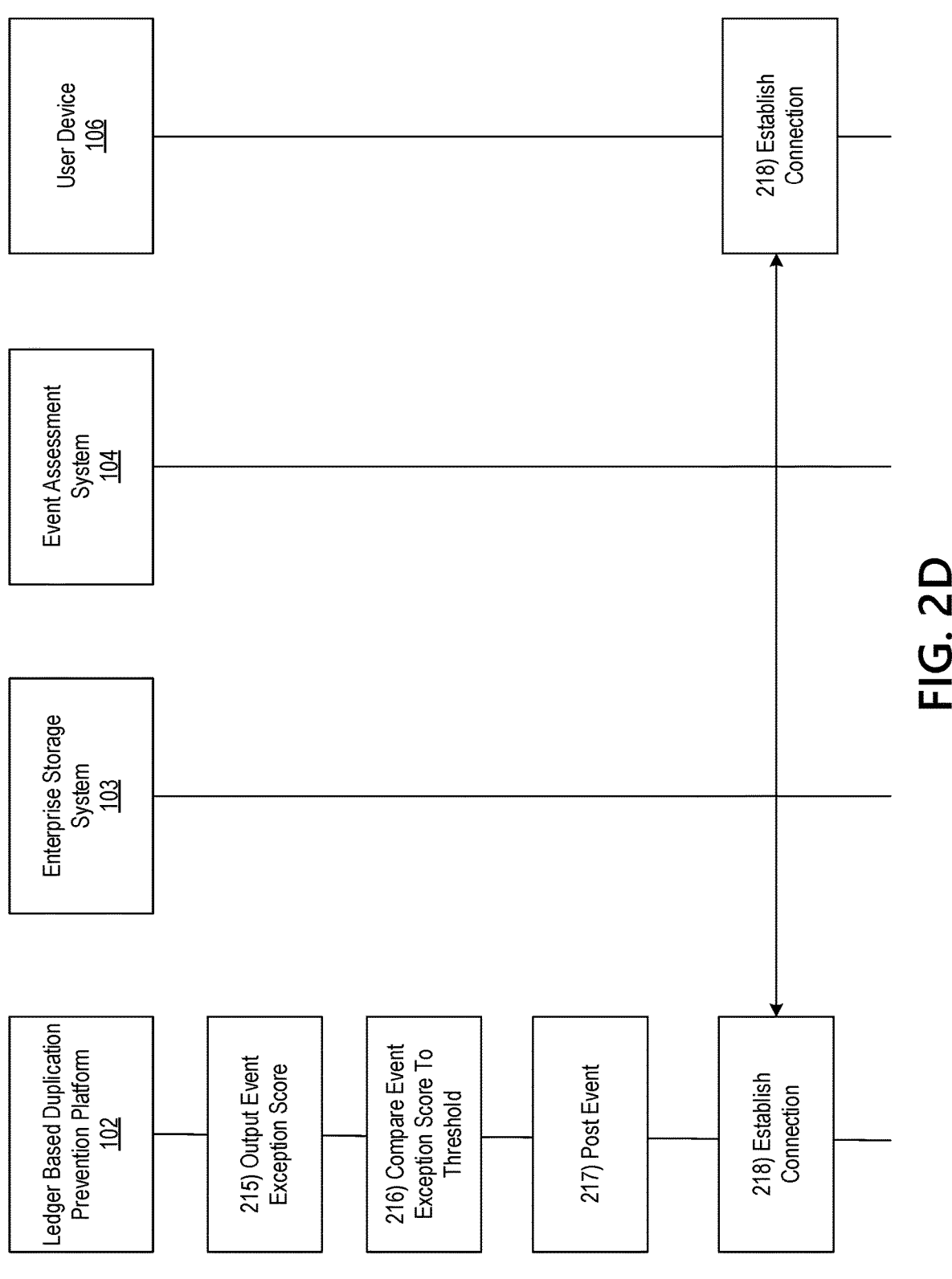

Referring to FIG. 2D, at step 215, ledger based duplication prevention platform 102 may output an event exception score. In some instances, the event score may be based on the number of exceptions that are triggered based on the machine learning engine's analysis of the event block. For example, ledger based duplication prevention platform 102 may determine an activity level of the user account associated with the event, and, based on the activity level exceeding a threshold, output an event exception. As another example, ledger based duplication prevention platform 102 may determine if a transaction corresponding to an event amount reaches a maximum transaction amount, and, based on the transaction amount reaching a maximum transaction amount, output an event exception. In some instances, ledger based duplication prevention platform 102 may determine whether an exception is triggered based on other information, such as event/transaction history, recent events, and/or other types of information.

In some instances, an event exception may be a binary output, in which, if the event exception is triggered, then ledger based duplication prevention platform 102 may output a numerical value of 1. Additionally or alternatively, if the event exception is not triggered, then ledger based duplication prevention platform may output a numerical value of 0. In some instances, the event score may be a numerical value that represents an aggregate of the number of event exceptions that were triggered.

At step 216, ledger based duplication prevention platform 102 may compare the event exception score to a threshold. For example, the threshold may be a numerical value (e.g., 1), that may represent a number of event exceptions necessary for the event not to be posted. In some instances, only one event exception may be needed to determine or not to post an event. In some instances, more than one event exception may be used as the threshold without departing from the scope of the disclosure. In some instances, the threshold may be dynamically configured based on, for example, a particular user account or account type.

For example, if the event exception score meets or exceeds the threshold then ledger based duplication prevention platform 102 may not post the event to the user account and proceed to step 222 and update the machine learning engine. In some instances, ledger based duplication prevention platform 102 may also update the distributed ledger by making a notation on the event block that indicates the corresponding event was not posted. If the event exception score does not meet or exceed the threshold, then ledger based duplication prevention platform 102 may proceed to step 217 and post the event.

At step 217, ledger based duplication prevention platform 102 may post the event. For example, the event may be posted to a user account associated with the event. At step 218, ledger based duplication prevention platform 102 may establish a connection with user device 106. For example, ledger based duplication prevention platform 102 may establish a third wireless data connection with user device 106 to link ledger based duplication prevention platform 102 to user device 106 (e.g., in preparation for a notification that the event was posted). In some instances, ledger based duplication prevention platform 102 may identify whether or not a connection is already established with user device 106. If a connection is already established with user device 106, ledger based duplication prevention platform 102 might not re-establish the connection. If a connection is not already established with user device 106, ledger based duplication prevention platform 102 may establish the third wireless data connection as described herein.

Figure 2E:
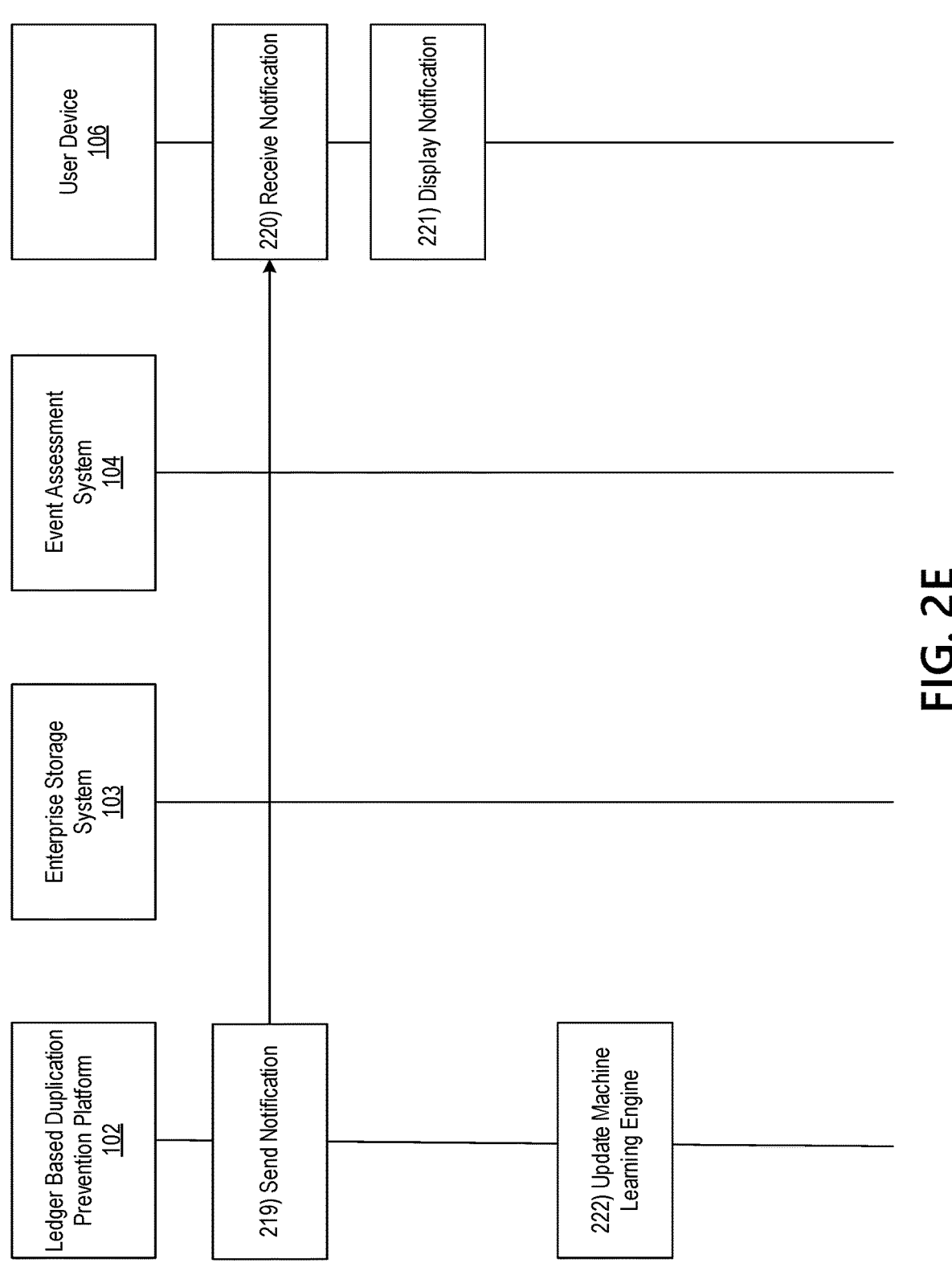

Referring to FIG. 2E, at step 219, ledger based duplication prevention platform 102 may send a notification. For example, ledger based duplication prevention platform 102 may send the notification to user device 106 while the third wireless data connection is established. In some instances, ledger based duplication prevention platform 102 may additionally send commands directing user device 106 to display the notification. At step 220, user device 106 may receive the notification and the commands directing user device 106 to display the notification.

Figure 4:
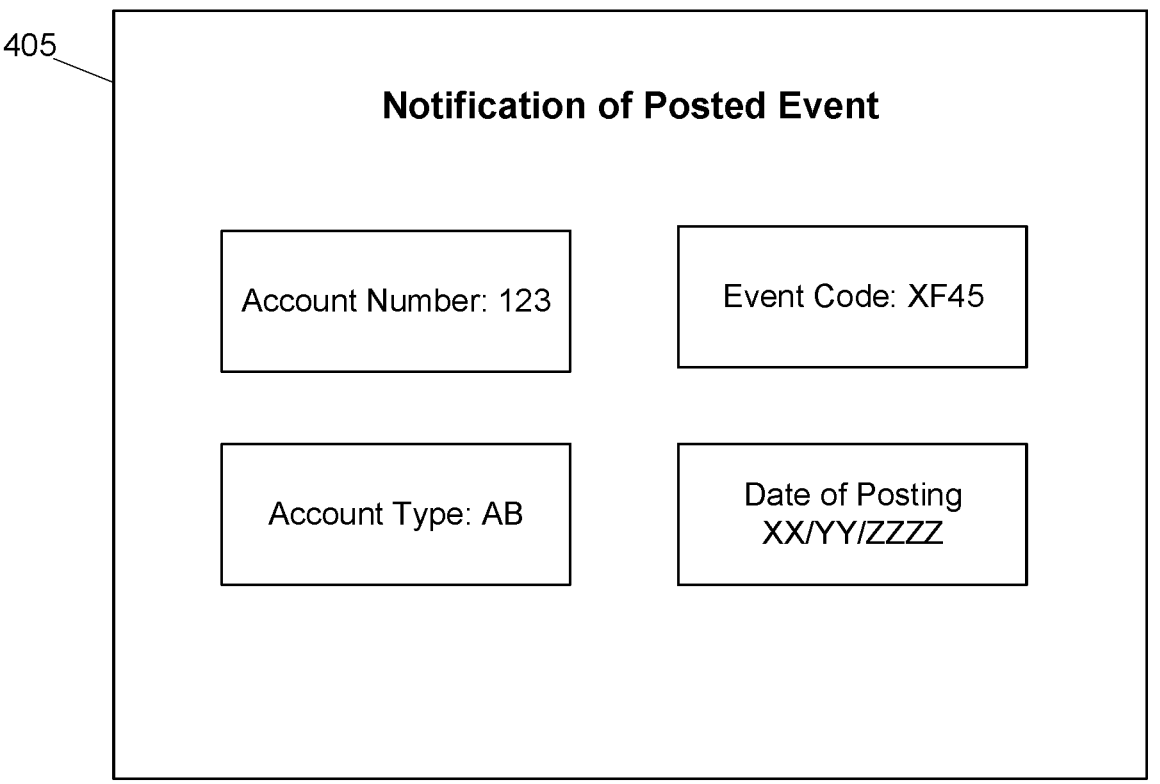
FIG. 4 depicts an illustrative graphical user interface for implementing an intelligent method to prevent duplicate event processing using a distributed ledger in accordance with one or more example embodiments.

At step 221, user device 106 may display the notification. In some instances, the display may be similar to the graphical user interface 605 depicted in FIG. 4. For example, the display may show an account number, account type, event code, date of posting, and/or other similar information. At step 222, ledger based duplication prevention platform 102 may update the machine learning engine. In some instances, then ledger based duplication prevention platform 102 may dynamically update the machine learning engine based on the actions performed in steps 210-217. In doing so, ledger based duplication prevention platform 102 may dynamically and continuously update (e.g., using a dynamic feedback loop) and/or otherwise refine the machine learning engine so as to increase accuracy of the machine learning engine over time.

Figure 3:
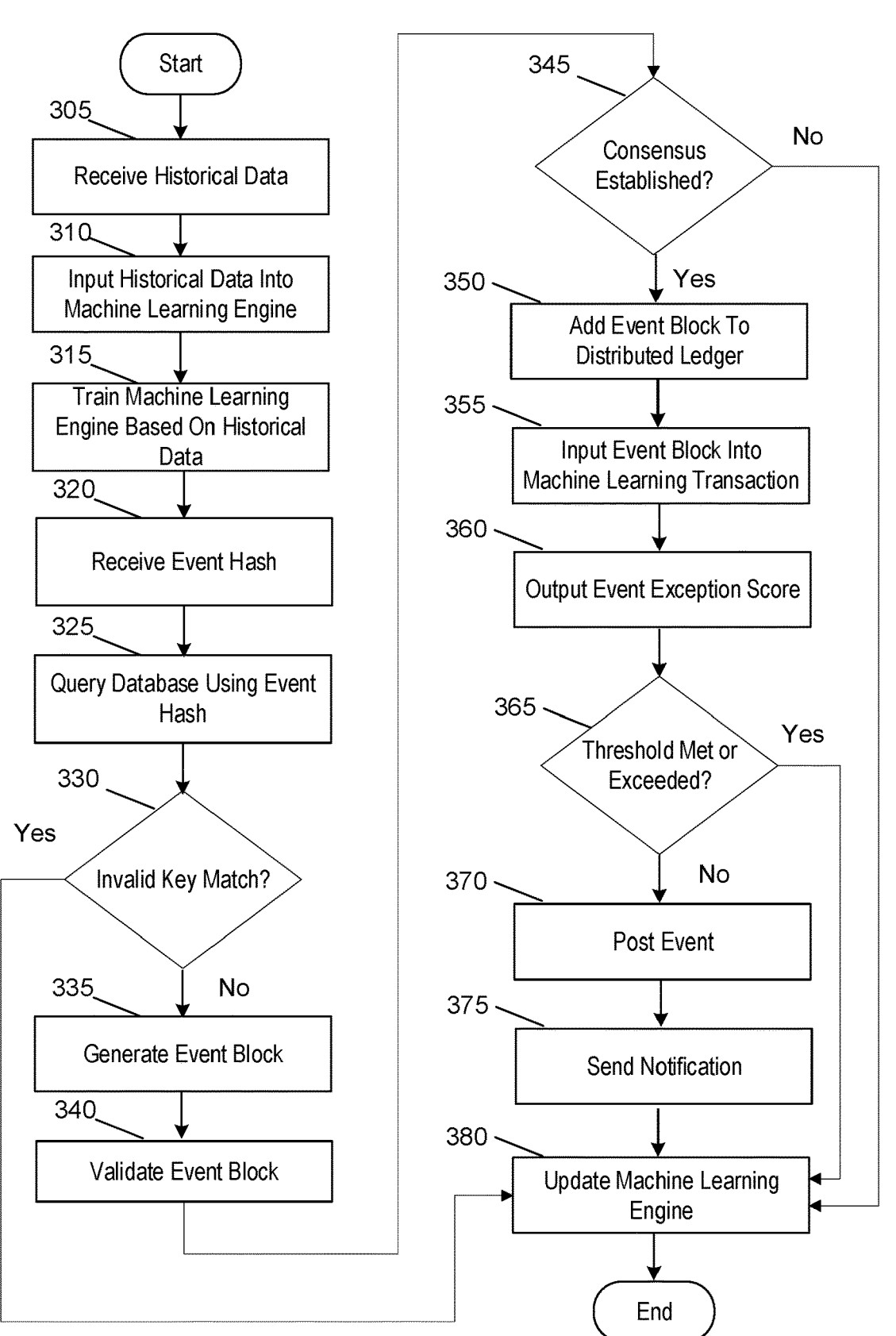
FIG. 3 depicts an illustrative method for implementing an intelligent method to prevent duplicate events processing using a distributed ledger with one or more example embodiments.

FIG. 3 depicts an illustrative method for implementing an intelligent method to prevent duplicate event processing using a distributed ledger in accordance with one or more example embodiments. At step 305, a computing platform having at least one processor, a communication interface, and memory may receive historical data. At step 310, the computing platform may input the historical data in a machine learning engine (e.g., machine learning engine 112c). At step 315, the computing platform may train the machine learning engine using the historical data.

At step 320, the computing platform may receive an event hash from an event assessment system (e.g., event assessment system 104). At step 325, the computing platform may query a database (e.g., invalid key database 112e) with the event hash. At step 330, the computing platform may determine whether information in the event hash matches one of a plurality of invalid keys stored in the database. If a match is found, the computing platform may proceed to step 380 and update the machine learning engine. If a match is not found, the computing platform may proceed to step 335.

At step 335, the computing platform may generate an event block based on the event hash. At step 340, the computing platform may validate the event block with one or more event assessment systems (e.g., event assessment system 104, event assessment system 105, and/or other event assessment systems). At step 345, the computing platform may determine whether consensus is established with the one or more event assessment systems. If consensus is not established, the computing platform may generate an invalid key based on the event block, store the invalid key in a database (e.g., invalid key database 112e), and proceed to step 380 and update the machine learning engine. If consensus is established, the computing platform may proceed to step 350.

At step 350, the computing platform may add the event block to a distributed ledger (e.g., distributed ledger module 112d). At step 355, the computing platform may input the event block in the machine learning engine. At step 360, the computing platform may output an event exception score. At step 365, the computing platform may determine whether an event exception is met or exceeded. If the threshold is met or exceeded, the computing platform may proceed to step 380 and update the machine learning machine. In some instances, the computing platform may also update the distributed ledger by making a notation on the event block that indicates the corresponding event was not posted. If the threshold is not met or exceeded, the computing platform may proceed to step 370.

At step 370, the computing platform may post the event to a corresponding user account. At step 375, the computing platform may send a notification and commands directing a user device (e.g., user device 106) corresponding to the user account to display a notification that the event has been posted. At step 380, the computing platform may update the machine learning engine.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:

at least one processor;

a communication interface communicatively coupled to the at least one processor; and memory storing computer-readable instructions that, when executed by the at least one processor, cause the computing platform to:

train, based on historical data, a machine learning engine, wherein training the machine learning engine configures the machine learning engine to determine whether to post an event associated with an event block to a user account;

receive a first event hash, wherein the first event hash corresponds to a first event that is associated with a first user account;

query an invalid key database to determine whether one of one or more invalid keys stored at the invalid key database matches information in the first event hash;

generate, based on determining that the information in the first event hash does not match any of the one or more invalid keys, a first event block based on the first event hash;

validate the first event block by communicating with one or more event assessment systems, wherein the validating establishes a consensus between the computing platform and the one or more event assessment systems;

add, based on the validating, the first event block to a distributed ledger;

input the first event block into the machine learning engine;

determine, using the machine learning engine, whether to post the first event associated with the first event block to the first user account, wherein the determining comprises:

outputting an event exception score based on triggering one or more event exceptions; and comparing the event exception score to a threshold;

post, based on the event exception score not meeting or exceeding the threshold, the first event associated with the first event block to the first user account; and send a notification that the first event was posted and one or more commands directing the first user account to display the notification that the first event was posted, wherein sending the one or more commands causes the first user account to display the notification that the first event was posted.

2. The computing platform of claim 1, wherein the memory stores computer-readable instructions that, when executed by the at least one processor, further cause the computing platform to:

receive a second event hash, wherein the second event hash corresponds to a second event that is associated with a second user account;

query the invalid key database to determine whether one of the one or more invalid keys stored at the invalid key database matches information in the second event hash;

generate, based on determining that information in the second event hash does match any of the one or more invalid keys, a second event block based on the second event hash;

invalidate the second event block by failing to establish the consensus between the computing platform and the one or more event assessment systems;

create a new invalid key based on the second event block; and store the new invalid key at the invalid key database.

3. The computing platform of claim 2, wherein the memory stores computer-readable instructions that, when executed by the at least one processor, further cause the computing platform to:

receive a third event hash, wherein the third event hash corresponds to a third event that is associated with a third user account;

query the invalid key database to determine whether one of the one or more invalid keys stored at the invalid key database matches information in the third event hash; and determine not to generate a third event block based on finding a match between the information in the third event hash and the new invalid key during the querying.

4. The computing platform of claim 1, wherein the training the machine learning engine further configures the machine learning engine to receive:

historical user account data, which comprises account numbers, product codes, geographic information, or balances; and historical data patterns, which comprises event activity, event types, transaction maximums, transaction minimums, or transaction history.

5. The computing platform of claim 1, wherein the distributed ledger further comprises a record of events associated with a plurality of user accounts and corresponding validated event blocks.

6. The computing platform of claim 1, wherein the first event hash comprises a first account number and a first event code.

7. The computing platform of claim 1, wherein the first event block comprises the first event hash, a first product code and a first transaction amount.

8. The computing platform of claim 1, wherein the first event block is generated using a cryptographic process.

9. The computing platform of claim 1, wherein the validating further comprises:

sending the first event block to the one or more event assessment systems; and receiving an indication from the one or more event assessment systems that the first event block has been validated.

10. The computing platform of claim 1, wherein the memory stores computer-readable instructions that, when executed by the at least one processor, further cause the computing platform to:

update, using a dynamic feedback loop and based on validating the first event block and determining to post the first event, the machine learning engine.

11. A method comprising:

at a computing platform comprising at least one processor, a communication interface, and memory:

training, based on historical data, a machine learning engine, wherein training the machine learning engine configures the machine learning engine to determine whether to post an event associated with an event block to a user account;

receiving a first event hash, wherein the first event hash corresponds to a first event that is associated with a first user account;

querying an invalid key database to determine whether one of one or more invalid keys stored at the invalid key database matches information in the first event hash;

generating, based on determining that the information in the first event hash does not match any of the one or more invalid keys, a first event block based on the first event hash;

validating the first event block by communicating with one or more event assessment systems, wherein the validating establishes a consensus between the computing platform and the one or more event assessment systems;

adding, based on the validating, the first event block to a distributed ledger;

inputting the first event block into the machine learning engine;

determining, using the machine learning engine, whether to post the first event associated with the first event block to the first user account, wherein the determining comprises:

outputting an event exception score based on triggering one or more event exceptions; and comparing the event exception score to a threshold;

posting, based on the event exception score not meeting or exceeding the threshold, the first event associated with the first event block to the first user account; and sending a notification that the first event was posted and one or more commands directing the first user account to display the notification that the first event was posted, wherein sending the one or more commands causes the first user account to display the notification that the first event was posted.

12. The method of claim 11, further comprising:

receiving a second event hash, wherein the second event hash corresponds to a second event that is associated with a second user account;

querying the invalid key database to determine whether one of the one or more invalid keys stored at the invalid key database matches information in the second event hash;

generating, based on determining that information in the second event hash does match any of the one or more invalid keys, a second event block based on the second event hash;

invalidating the second event block by failing to establish the consensus between the computing platform and the one or more event assessment systems;

creating a new invalid key based on the second event block; and storing the new invalid key at the invalid key database.

13. The method of claim 12, further comprising:

receiving a third event hash, wherein the third event hash corresponds to a third event that is associated with a third user account;

querying the invalid key database to determine whether one of the one or more invalid keys stored at the invalid key database matches information in the third event hash; and determining not to generate a third event block based on finding a match between the information in the third event hash and the new invalid key during the querying.

14. The method of claim 12, wherein the validating further comprises:

sending the first event block to the one or more event assessment systems; and receiving an indication from the one or more event assessment systems that the first event block has been validated.

15. The method of claim 14, further comprising updating, using a dynamic feedback loop and based on validating the first event block and determining to post the first event, the machine learning engine.

16. The method of claim 11, wherein training the machine learning engine further configures the machine learning engine to receive:

historical user account data, which comprises account numbers, product codes, geographic information, or balances; and historical data patterns, which comprises event activity, event types, transaction maximums, transaction minimums, transaction types, or transaction history.

17. The method of claim 11, wherein the distributed ledger further comprises a record of event associated with a plurality of user accounts and corresponding validated event blocks.

18. The method of claim 11, wherein the first event hash comprises a first account number and a first event code.

19. The method of claim 11, wherein the first event block is generated using a cryptographic process.

20. One or more non-transitory computer-readable media storing instructions that, when executed by a computing platform comprising at least one processor, a communication interface, and memory, cause the computing platform to:

train, based on historical data, a machine learning engine, wherein training the machine learning engine configures the machine learning engine to determine whether to post an event associated with an event block to a user account;

receive a first event hash, wherein the first event hash corresponds to a first event that is associated with a first user account;

query an invalid key database to determine whether one of one or more invalid keys stored at the invalid key database matches information in the first event hash;

generate, based on determining that the information in the first event hash does not match any of the one or more invalid keys, a first event block based on the first event hash;

validate the first event block by communicating with one or more event assessment systems, wherein the validating establishes a consensus between the computing platform and the one or more event assessment systems;

add, based on the validating, the first event block to a distributed ledger;

input the first event block into the machine learning engine;

determine, using the machine learning engine, whether to post the first event associated with the first event block to the first user account, wherein the determining comprises:

outputting an event exception score based on triggering one or more event exceptions; and comparing the event exception score to a threshold;

post, based on the event exception score not meeting or exceeding the threshold, the first event associated with the first event block to the first user account; and send a notification that the first event was posted and one or more commands directing the first user account to display the notification that the first event was posted, wherein sending the one or more commands causes the first user account to display the notification that the first event was posted.

\* \* \* \* \*